United States Patent [19]

Schweitzer, III et al.

[11] Patent Number: 5,436,784
[45] Date of Patent: Jul. 25, 1995

[54] MOTOR PROTECTION RELAY USING THERMAL MODELS

[75] Inventors: Edmund O. Schweitzer, III, Pullman, Wash.; Stanley E. Zocholl, Holland, Pa.

[73] Assignee: Schweitzer Engineering Laboratories, Inc., Pullman, Wash.

[21] Appl. No.: 105,009

[22] Filed: Aug. 11, 1993

[51] Int. Cl.⁶ .............................................. H02H 7/08
[52] U.S. Cl. ...................................... 361/25; 361/27; 361/103
[58] Field of Search ........................ 361/25, 27, 93, 23, 361/103, 24

[56] References Cited

U.S. PATENT DOCUMENTS 4,547,826 10/1985 Premerlani ............................ 361/25
4,743,818  5/1988 Quayle et al. ......................... 361/24

Primary Examiner—A. D. Pellinen
Assistant Examiner—S. Jackson
Attorney, Agent, or Firm—Jensen & Puntigam

[57] ABSTRACT

The motor relay includes thermal models representing the start and run conditions of a motor. The thermal models are implemented using measured current values and certain known operating parameters available from the manufacturer, specifically full load current, locked rotor thermal time and rated service factor. The thermal model information is compared with threshold thermal model values to determine when an overload condition has been reached.

11 Claims, 2 Drawing Sheets

MOTOR PROTECTION RELAY USING THERMAL MODELS

TECHNICAL FIELD

This invention relates generally to the field of induction motors and, more specifically, concerns a system for overload protection for such motors.

BACKGROUND OF THE INVENTION

Conventionally, protection for electric induction motors against overheating has been achieved through the use of overcurrent elements, which are also used for fault protection for electric power systems. The overcurrent elements are typically coordinated with the time/current characteristic curves of the particular motor being protected. These time/current curves are typically available from the manufacturer of the motor. However, such coordination is usually valid thermally only for limited operating conditions, since the time overcurrent elements do not model the actual thermal characteristics, i.e. the actual heating and cooling, of the motor during its operation. Further, the reset characteristics of overcurrent elements do not bear any relation to the actual operating thermal time constant of a motor.

Typically, the overcurrent elements will be set with a time delay long enough to allow the motor to start, i.e. they will permit a required high level of current for a sufficient time to start the motor, but shorter than the thermal limit time for a locked rotor portion of the motor. A separate negative sequence overcurrent element is often used to prevent thermal damage caused by excessive unbalanced three phase current. Unbalanced current, which produces negative sequence current, in turn produces a severe heating effect in the rotor. The negative sequence elements are themselves typically set quite sensitively, but in structure and operation are independent of and do not take into account the heating effect of the positive sequence current component of the unbalanced three phase current.

As indicated above, however, overcurrent elements do not operate in accordance with the temperature rise in the motor.

One solution to the disadvantages of the above-described conventional motor protection system involves a "thermal model" approach, which takes into account both the positive and the negative sequence heat sources at work on the motor. In this solution, set out in U.S. Pat. No. 4,914,386 to Zocholl, motor voltage and current values are directly measured at the motor terminals, and those values are used to calculate the change in the impedance at the motor terminals during the motor start-up period. From this information, the speed of the motor may be determined, and motor speed is indicative of the actual thermal condition of the motor. The relevant portions of that patent, concerning the general development of a thermal model for an induction motor, are hereby incorporated by reference.

The thermal model approach of the '386 patent, however, has disadvantages, since a voltage measurement is necessary, which requires additional hardware elements, such as voltage transformers. Hence, such a system is expensive. Further, in many cases certain required motor parameter information to implement the thermal models is not readily available from the motor manufacturer. Hence, existing thermal model approaches are basically impractical, except in a few motor situations, even though the thermal model approach generally is advantageous, since it is related to the actual thermal conditions in the motor.

In a somewhat different approach, temperature sensors have been positioned within the structure of the motor itself in order to sense motor temperature directly. However, these attempts have been largely unsuccessful, since it is difficult to properly locate such temperature sensors without interfering with the operation of the motor. Also, such an approach has not heretofore been very effective because by the time the threshold of the temperature sensor is reached, substantial damage to the motor has often already occurred.

Hence, there remains a need for thermal protection system for motors which is accurately reflective of the actual thermal conditions within the motor, yet is practical for a wide variety of motors and responsive to actual thermal conditions prior to any damage occurring in the motor.

SUMMARY OF THE INVENTION

Accordingly, the present invention is a protective relay for an induction motor, having known operating parameters, comprising: means for measuring the input current to the motor; means for establishing a first thermal threshold value for a first, start condition of the motor, based on said selected operating parameters; means for determining a representation of the thermal condition of the motor during the start condition thereof, using said measured current and said operating parameters; means comparing the start condition thermal representation with said first thermal threshold value and for producing an output signal when said first thermal threshold value is exceeded by said start thermal representation; means for establishing a second thermal threshold value for a second, run condition of the motor; means for determining a representation of the thermal condition of the motor during the run condition thereof, using the measured current and said operating parameters; and means comparing the run thermal representation with said second thermal threshold value and for producing an output signal when said second thermal threshold value is exceeded by said run thermal representation.

BEST MODE FOR CARRYING OUT THE INVENTION

Figure 1:
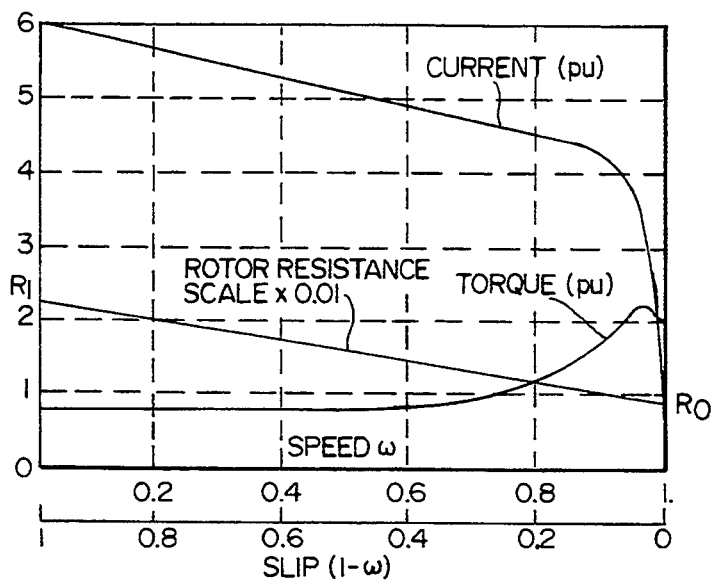
FIG. 1 is a diagram showing per unit current and torque and rotor resistance versus speed ($\omega$) and slip ($1-\omega$) for an induction motor.
Figure 2:
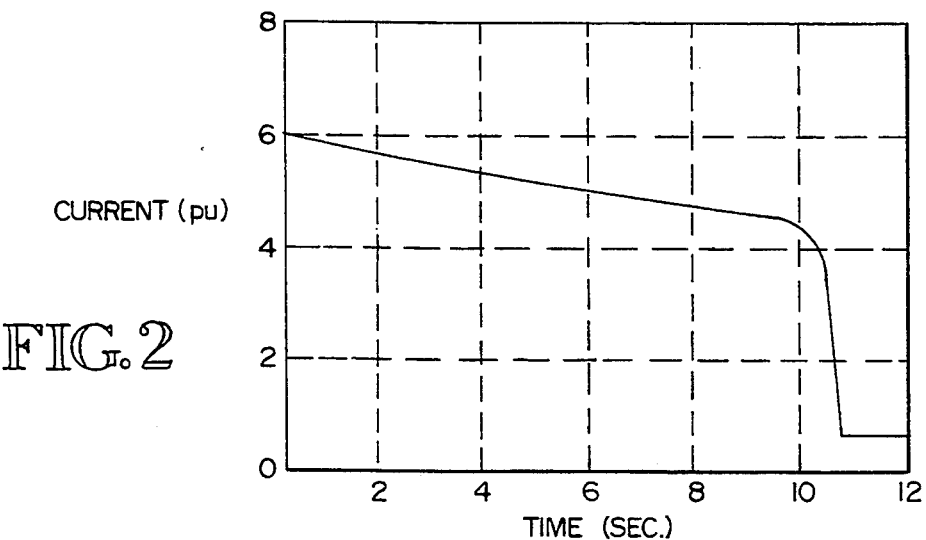
FIG. 2 is a diagram showing starting current against time for an induction motor.

FIGS. 1 and 2 show conventional plots of motor operation, involving motor current, torque and resistance versus motor speed, slip and time. FIG. 1 shows that motor current decreases from a high initial value until the peak torque of the motor is developed at approximately the full speed of the motor. Motor "slip" is defined by the relationship of the speed of the rotating magnetic field (synchronous speed) and the speed of the rotor, such that under start conditions, when the speed of the motor is at zero, slip is at one (maximum), while when the motor is at full rated speed, slip is approximately zero. FIG. 2 shows that current to the motor starts out high and decreases over time to a "run" condition value.

The current distribution in the rotor portion of the motor and the resistance of the rotor are both slip dependent. The current is forced to the outer periphery of the rotor when the rotor just begins to turn during the start condition, and gradually will occupy more and more of the rotor area as the speed increases and the slip decreases to zero. These conditions create an opportunity for overheating and possible thermal damage during the operation of the motor until it reaches operating speed, with its relatively low current and low resistance. The operation of a motor until it reaches its run speed is generally referred to as the start condition. As indicated above, at start, when the slip is one, the rotor resistance is relatively high, but decreases significantly as the slip decreases to zero.

Following completion of the start condition, when the motor is at rated speed, the current in the motor is relatively low, and the rotor resistance decreases to a fraction of that during the start condition. This is referred to as the run condition.

In the run condition, with balanced stator current, current is approximately evenly distributed in the rotor bars, and the heating effect is due entirely to the positive sequence motor current. However, when the three phase current is unbalanced, there exists a negative sequence component to the current which produces a field rotating at synchronous speed in the reverse direction. The negative sequence current in the rotor is confined to approximately one sixth of the available cross sectional area of the rotor bars and produces a severe heating effect when present. Hence, an accurate determination of the thermal condition of the motor must take into account both the positive sequence current and any negative sequence current which occurs due to an unbalanced current condition.

While the most accurate and complete thermal model of a motor's operation includes a small transition zone between the start and run conditions, generally the motor's operation can be accurately represented by its two basic operating conditions, i.e. the start and run conditions.

The present invention includes thermal models based on actual motor operation, one thermal model for the start condition and one for the run condition. Both of the thermal models take into account the positive and negative sequence heat sources, which are slip dependent, as well as the thermal resistance and thermal capacity of the particular motor being protected.

The double thermal model approach of the present invention represents actual heating conditions in the motor, and hence is more accurate and reliable than conventional overcurrent element based systems. The present thermal model approach is more accurate and comprehensive than previous systems using thermal models because it covers the full range of motor operation, does not require voltage determinations, and, unlike other thermal model approaches which require motor information which often is either difficult to obtain or not readily available, uses four basic motor operating parameters which are typically readily available from the motor manufacturer to develop the models for each motor.

These parameters specifically include values of full load current, locked rotor current, locked rotor thermal time and rated service factor. Full load current (FLA) refers to the current in the motor at its rated horsepower, with the rated value of voltage applied to the motor. Locked rotor current (LRA) is the relatively high current in the rotor during the start condition, when the rotor is not turning, with rated voltage applied to the motor terminals. The motor protection system must take into account the required period of time that this high start current must be present to start the motor, without prematurely tripping the circuit breaker.

However, there is also a temperature limit established when a circuit breaker trip will in fact be initiated. The locked rotor time (LRT) is the time that the locked, i.e. non-turning, rotor absorbs the locked rotor current until the established trip temperature, referred to as the "hot" temperature, is reached. The value of LRT is thus the time during which the rotor can absorb the high locked rotor current before it dangerously overheats. Service factor (SF) is a conventional parameter referring to a rated multiplier for motors relative to the stated horsepower, i.e. a motor having a horsepower rating of 1000 and a service factor of 1.2 will actually produce a horsepower output of 1200.

Figure 3:
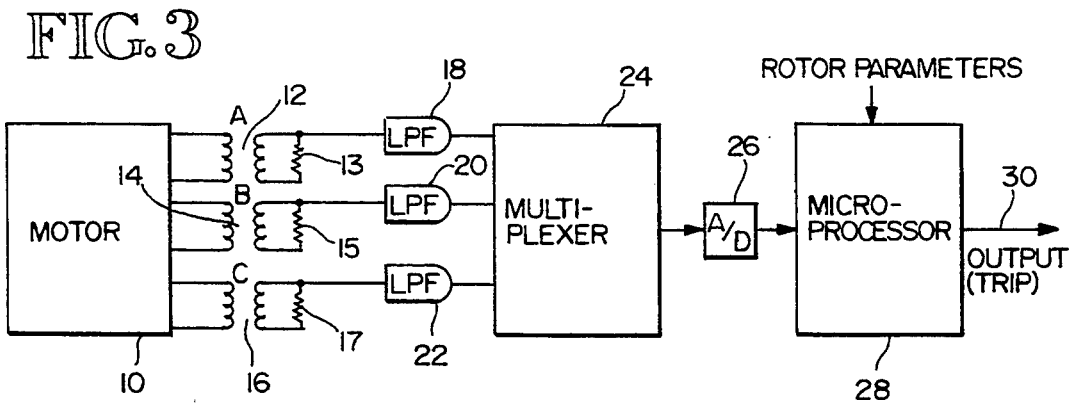
FIG. 3 is a simplified block diagram of the system of the present invention.

FIG. 3 shows a simplified block diagram of the system of the present invention. A three phase induction motor is shown generally at 10. Such motors are typically found in various industrial applications, such as factories, etc. The current in each of the three phases (A,B,C) of the power signal at the motor is connected to respective transformers 12, 14 and 16, each of which has an associated resistor 13, 15 and 17. The signals from the transformers are applied to low pass filters 18, 20 and 22 and then a multiplexer 24. The multiplexed signals are sent to an A/D converter 26, and then to a microprocessor 28, which implements and carries out the thermal model protection using the motor parameters for the particular motor being protected. If preselected threshold temperatures are exceeded in the motor, as indicated by the thermal models, than an output signal is applied on output line 30 to trip a circuit breaker (not shown) for the motor, preventing damage to the motor.

Figure 4:
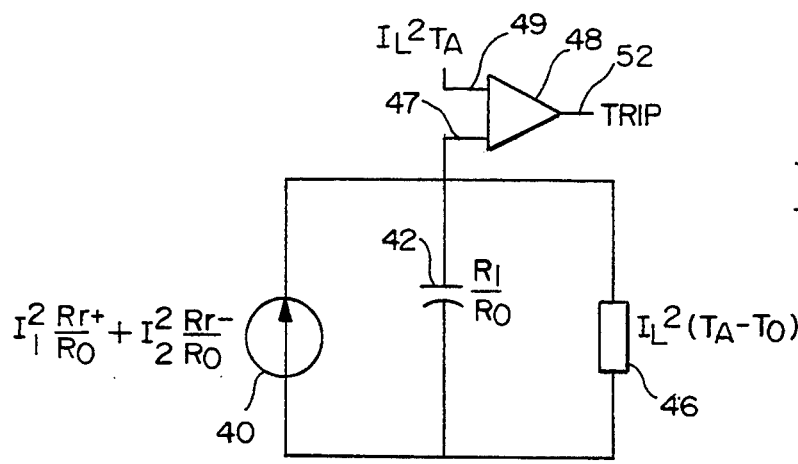
FIG. 4 is a diagram showing a general thermal model for a rotor portion of an induction motor.
Figure 5:
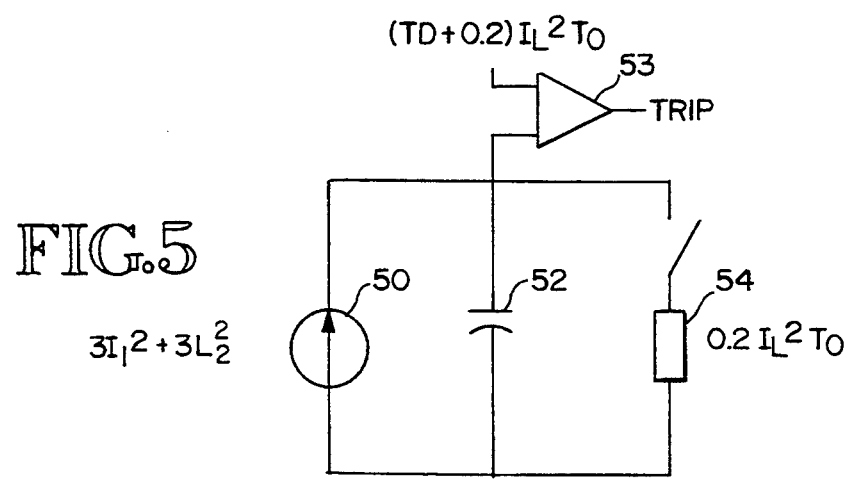
FIG. 5 is a diagram showing a thermal model for the start condition for a rotor portion of an induction motor.
Figure 6:
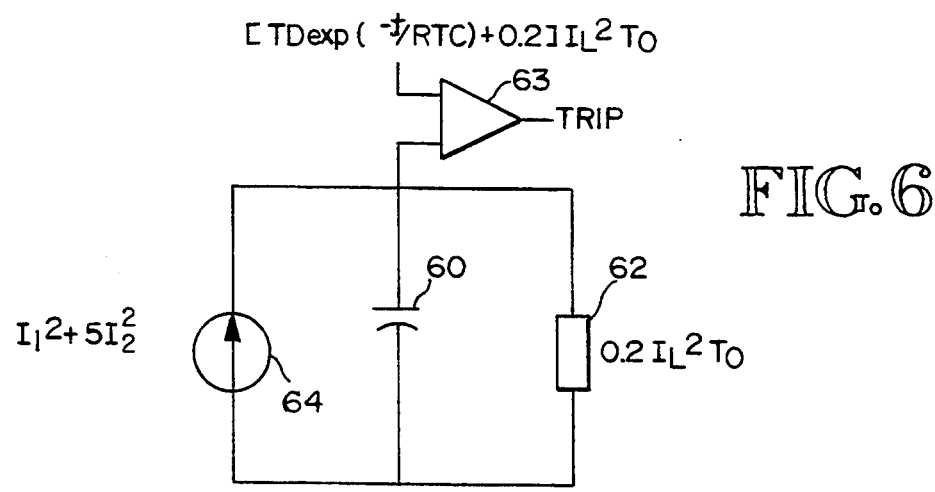
FIG. 6 is a diagram showing a thermal model for the run condition for a rotor portion of an induction motor.

FIGS. 4 through 7 show the implementation of the thermal models used in the present invention. As indicated above, the thermal models for a particular motor are defined by particular parameters which are readily available to the motor engineer and which may be conveniently programmed into the motor relay. The models are implemented in software in the microprocessor. FIG. 4 shows a general rotor thermal model, which adapts to a motor start model or run model, which are shown in FIGS. 5 and 6. Actual current level in the motor determines whether the start condition model or the run condition model is used. Referring to FIG. 4, the heating effect caused by the power supplied to the motor is represented by element 40. The total heating effect is the combination of the positive sequence current ($I_1$) and the negative sequence current ($I_2$) multiplied by their respective resistances.

The positive sequence current resistance is the positive sequence slip dependent rotor resistance ($R_{r+}$) divided by the rotor resistance at the rated speed ($R_0$), while the negative sequence resistance is the negative sequence slip dependent rotor resistance ($R_{r-}$) divided by the rotor resistance at rated speed ($R_0$), where $R_{r+} = (R_1 - R_0)S + R_0$, while $R_{r-} = (R_1 - R_0)(2-S) + R_0$ where $R_1$ is the locked rotor resistance, $R_0$ is the rotor resistance at rated speed, S is the positive sequence slip and $2-S$ is the negative sequence slip.

The capacitive element 42 represents the thermal mass of the rotor, and is equal to $R_1/R_0$. The resistor element 46 represents the cooling effect present in the motor, i.e. the ability of the motor to give off heat. This is represented by the general expression $I_L^2 (T_A - T_0)$ where $I_L$ equals the locked rotor current, $T_A$ is the locked rotor thermal limit time, starting with the motor at ambient temperature (40°), and $T_0$ is the locked thermal limit time starting when the motor is at a run temperature (90° C.). Typically, $R_1/R_0$ is 3. The value of S (positive sequence slip) during the start condition is 1.0 and during the run condition is 0.0. The combined effect of the above elements representing the thermal condition of the motor is applied to one input 47 of a comparator 48 which compares that value, representing overall motor "heat", with a threshold temperature value on line 49 of $I_L^2 T_A$. If the value at input 47 is greater than the input at 49, then a trip signal is produced on line 52. A typical threshold temperature value (hot spot temperature) for the start condition is 300° C.

FIG. 5 shows the general thermal model of FIG. 4 in a start configuration. The start condition is defined as when the measured motor current is greater than 2.5 per unit of the rated current (run condition) of the motor. During the start condition, $R_{r+} = R_1$, $R_{r-} = R_1$ and the power supplied to the rotor represented by source 50 reduces to $3 I_1^2 + 3 I_2^2$. The thermal capacity element 52 ($R_1/R_0$) is 3, and the thermal resistance element 54 is infinity (the resistor 46 is hence shown out of the circuit) since there is effectively no cooling effect during the start condition. The threshold value for the comparator 53 has an adjustment factor TD, which, when set to one, permits maximum rotor heating. A value of less than one might be used in situations where the motor normally starts quickly, so the maximum temperature allowed (before the breaker is tripped) would reasonably be less. $T_0$ (the locked thermal limit time when the motor is at a run temperature) is used in the threshold. This thermal model, carried out in the microprocessor in software, represents the start condition of motor operation, and will produce a motor shut-down, if, for instance, the rotor does not turn after an extended period of time, indicating a locked rotor condition.

FIG. 6 shows the general model of FIG. 4 for the run condition of the rotor. The run condition is defined as when the motor current is below 2.5 times the motor rated current. In the run model, the threshold value to comparator 63 decays from the threshold of the start condition model to the run condition model at a rate determined by the thermal time constant (RTC) of the motor. RTC is obtained from the RC circuit 60 and 62 and is thus equal to $0.6 I_L^2 T_0$, since element 60 (thermal capacity $R_1/R_0$) is 3 and element 62 (thermal resistance) is $0.2 I_L^2 T_0$ during the run condition The time t begins each time the run condition is declared. The complete threshold value at comparator 63 is $[TDexp(-t/RTC + 0.2]I_L^2 T_0$. The thermal resistance $0.2 I_L^2 T_0$, is approximately 50° C. during the run condition In the heat source 64, the positive sequence resistance is equal to $R_0$ while the negative sequence resistance is $2R_1 + R_0$, such that the power source element 64 reduces to $I_1^2 + 5I_2^2$.

The above described thermal models produce motor protection which correlates with actual thermal conditions in the motor.

In addition to the above thermal models, a motor relay may include some additional features, including a load jam element, a load loss element, a starts per hour element, and perhaps conventional overcurrent elements used to protect the cabling between the breaker and the motor. For load jam protection, a signal trip will be issued when the current to the motor exceeds the pre-established load jam current setting for a set period of time after the rotor has been determined to be in the run condition. For load loss protection, a trip is issued when the current to the motor falls below the pre-established load loss current setting for a set time after the run condition has been reached. Both of these protection "elements" are implemented in software in the microprocessor.

For the starts per hour protection, a "start" count is made each time the current exceeds the start current standard, i.e. 2.5 times the full load motor current. Each start indication is stored in a buffer. The buffer is checked at the time of each start. When the number in the buffer exceeds the number set for one hour or some other specific time, a circuit breaker trip occurs.

Although a preferred embodiment has been disclosed herein for purposes of illustration, it should be understood that various changes, modifications and substitutions may be incorporated in such embodiment without departing from the spirit of the present invention, which is defined by the claims which follow.

We claim:

1. A protective relay for an induction motor, having known operating parameters, comprising:
   means for measuring the input current to the motor;
   means for establishing a first thermal threshold value for a first, start condition of the motor, based on selected operating parameters;
   means for determining a representation of the thermal condition of the motor during the start condition thereof, including means for determining positive and negative sequence power to the motor during the start condition, using positive and negative sequence current values and resistance-dependent values determined from selected operating parameters;
   means comparing the start condition thermal representation with said first thermal threshold value and for producing an output signal when said first thermal threshold value is exceeded by said start thermal representation;
   means for establishing a second thermal threshold value for a second, run condition of the motor, the second thermal threshold value being different than the first thermal threshold value;
   means for determining a representation of the thermal condition of the motor during the run condition thereof, including means for determining positive and negative sequence power to the motor during the run condition, using positive and negative sequence current values and resistance-dependent values determined from selected operating parameters; and
   means comparing the run condition thermal representation with said second thermal threshold value and for producing an output signal when said second thermal threshold value is exceeded by said run thermal representation.

2. A system of claim 1, including means using said output signals to trip a circuit breaker to interrupt operation of the motor.

3. A system of claim 1, wherein the first and second threshold values and the start and run condition thermal representations are for a rotor portion of the motor.

4. A system of claim 2, in which the positive and negative sequence power is represented by the sum of three times the value of the positive sequence current and three times the value of the negative sequence current.

5. A system of claim 3, wherein the operating parameters include full load current, locked rotor current, locked rotor thermal time, and rated service factor, all of which are available from the motor manufacturers.

6. A system of claim 3, wherein the first and second threshold values are determined using the operating parameters of a locked rotor current and the thermal time for the rotor at the locked rotor current value.

7. A system of claim 6, wherein said thermal time is determined using the temperature of the rotor during its run condition as a base value.

8. A system of claim 3, wherein the thermal representation for the start and run conditions of the rotor includes a representation of the thermal mass of the rotor.

9. An apparatus of claim 8, when the thermal mass of the rotor is represented by an expression which includes the operating parameters of locked rotor resistance and the rotor resistance at the rated speed of the rotor.

10. A system of claim 3, wherein the run thermal representation includes a representation of the flow of heat from the rotor to the atmosphere during the run condition.

11. A system of claim 10, wherein said heat flow from the rotor is determined using locked rotor current and thermal time parameters.

* * * * *